United States Patent
Krause

Patent Number: 5,293,358
Date of Patent: Mar. 8, 1994

[54] APPARATUS AND METHOD FOR GENERATION OF INTEGRATED COMPOSITE AUDIO-VISUAL WORKS

[75] Inventor: Bernard L. Krause, San Francisco, Calif.

[73] Assignee: Wild Sanctuary Communications, Inc., Glen Ellen, Calif.

[21] Appl. No.: 871,846

[22] Filed: Apr. 21, 1992

[51] Int. Cl.⁵ .......................... H04B 1/20; G09B 5/00
[52] U.S. Cl. ........................................... 369/2; 434/308
[58] Field of Search ......................................... 369/1–5, 369/14; 434/308

[56] References Cited

U.S. PATENT DOCUMENTS

| | | | |
|---|---|---|---|
| 4,070,698 | 1/1978 | Curtis et al. | 369/3 |
| 4,969,135 | 11/1990 | Tobe | 369/2 |
| 5,065,345 | 11/1991 | Knowles et al. | 434/308 X |

*Primary Examiner*—Tony M. Argenbright
*Attorney, Agent, or Firm*—Flehr, Hohbach, Test, Albritton & Herbert

[57] ABSTRACT

A delivery apparatus and method for the arrangement, generation and delivery of an integrated composite work having one of audio and visual content. The system includes a playback device (14) having a plurality of the audio or visual works stored therein, preferably on storage media (55), with distinctive identification means. Each of the stored works has a predetermined fixed content and the content of each work is one of simultaneous and sequentially related to at least one other of the works. A controller (42) is connected to the playback apparatus (41) and generates a playback of a selected first work. After the first work is selected, the controller (42) selects an additional work. If playback of the two works is to be simultaneous, the selection of the additional work will be made only from works which are simultaneously related. If the playback of the two works is to be sequential, the selection of the additional work will be made only from works which are sequentially related.

34 Claims, 1 Drawing Sheet

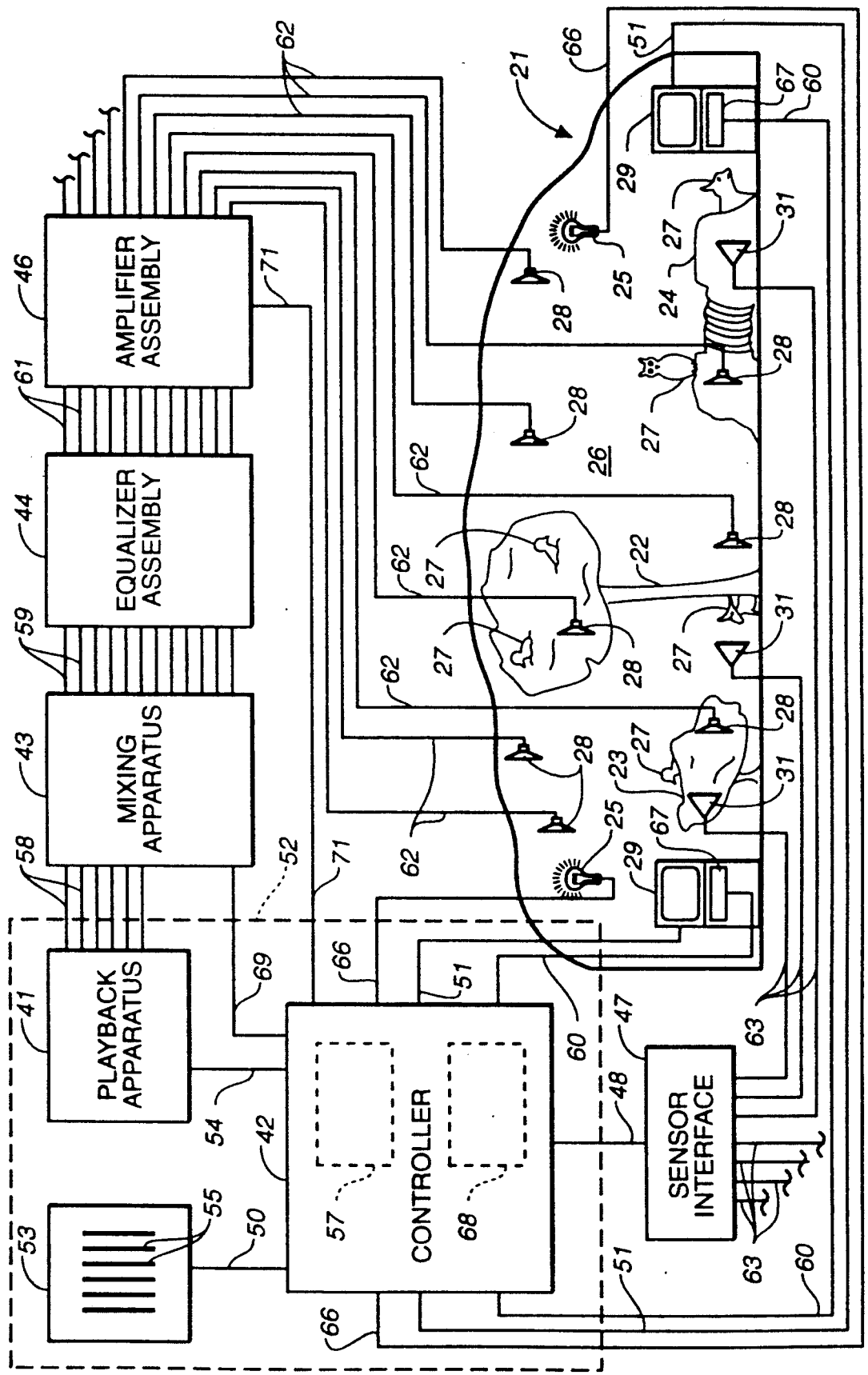

APPARATUS AND METHOD FOR GENERATION OF INTEGRATED COMPOSITE AUDIO-VISUAL WORKS

TECHNICAL FIELD

The present invention, in general, is to systems for playing back audio and visual works or compositions, and relates, more particularly, to apparatus and method for the arrangement and generation of composite audio and/or visual works.

BACKGROUND ART

Conventional audio playback apparatus, such as a compact disk player, has the capability of sequentially playing a random sequence of pre-recorded audio tracks or cues. Thus, a plurality of recordings by the same artist or same composer or of audio-related material of various kinds can be randomly shuffled by the controller of the disk player and then played for the listener. This technology can also be used for the random sequential playing of video disk tracks, although such capability is not in such wide-spread use.

The sequential playback of pre-recorded audio or video works, however, has been limited to the sequential playing of a plurality of discrete compositions, rather than the generation of an integrated or continuous composite composition from the pre-recorded works. Thus, in prior art systems one complete musical composition is played and then another one is randomly selected and played. No attempt is made to form a unitary, although composite, musical work from two or more pre-recorded tracks.

One area in which pre-recorded audio compositions have been extensively used is in connection with public displays of the type found in museums, entertainment facilities and trade shows. Thus, a diorama illustrating the habitat of a particular group of animals also may include recordings of the voices of these animals in their natural habitat or environment. Most typically, the recordings played at such public exhibitions will be created by a sound engineer who overlays and mixes a plurality of individual recorded tracks to form a single recording that can be played for visitors of the diorama. A single track of, for example, fifteen minutes can be used to illustrate the various voices of the inhabitants of the diorama, and the visitors will have an experience which is substantially enhanced over merely the visual impact of the diorama. Museum personnel, however, will hear the diorama recording over and over during the course of the day to the point that the repeating sequencing of even a fifteen minute track becomes aggravating.

Several types of enhancements have been provided for the museum-type, repeating, audio delivery systems. First, infrared sensors have been used to sense the density or number of people listening to the audio program and to adjust the volume. When more listeners are present, the volume will be shifted toward a high volume setting, while the absence of sensed listeners reduces the volume. Second, sensors also have been used to trigger a pre-recorded audio sound so that when a listener walks in front of a sensor a sound track or sound cue is played. The first of these enhancements does not affect the monotony of repetition, and the second only has the minor impact of adding an event-driven sound to the overall audio playback.

Another enhancement which has been employed is to pan or move the sound being played over the plurality of spaced apart speakers in a speaker system. Thus, a rain storm can be heard first at one end of the diorama and then gradually move or pan through the speaker system to the opposite end. This type of enhancement similarly does not eliminate the redundancy of repetition, and the pans or moves of the sound merely become part of the repeating pattern.

It is also known in the music industry to create musical compositions by computer-controlled apparatus. Thus, a music synthesizer can be controlled by a computer in a manner used to generate a musical composition, but the generation of such audio or musical works is not based upon pre-recorded material, but instead on the synthesis of music as controlled by music composition software.

OBJECTS OF THE INVENTION

Accordingly, it is an object of the present invention to provide an audio or visual composition delivery apparatus and method which is capable of the arrangement and generation of integrated, composite, audio or visual works from pre-recorded tracks and/or electronically-stored data.

A further object of the present invention is to provide an audio delivery system or visual work delivery system in which related and pre-recorded works can be arranged and generated as a plurality of integrated composite works without the accompanying tediousness of repetition.

Another object of the present invention is to provide a method and apparatus for generating audio or visual works which can be accomplished by using conventional components, better simulates the randomness of natural environments, can be easily modified or lengthened, and is suitable for either audio or visual works.

The apparatus and method of the present invention have other objects and features of advantage which will become apparent from and are set forth in more detail in the accompanying drawing and the following description of the best mode of carrying out the invention.

DISCLOSURE OF INVENTION

The apparatus for arrangement, generation and delivery of an integrated composite work having at least one of audio and visual content of the present invention is comprised, briefly, of a playback device, a storage device having a plurality of works of predetermined, fixed content contained therein with associated distinctive identification means for each of the works. The stored works have one of sequentially related content and simultaneously related content to at least one of the other works. The apparatus further includes control device connected to the playback device and storage device and generating a playback of a first of the stored works and further generating one of a simultaneous and sequential playback of a randomly selected at least one second work from the remaining of the works. The second work selected has a sequentially related content if it is played in sequence with the first work and a simultaneously related content if it is played simultaneously with the first work to thereby deliver an output of a composite yet continuous and unitary work having related content.

In another aspect, the method of the present invention is comprised, briefly, of the steps of generating one of an audio and video output of a first composition having a predetermined fixed content; randomly selecting at least one additional work from a plurality of additional works each having a predetermined, fixed content, which additional work has a content that is either sequentially related or simultaneously related to said content of the first work; and at least one of simultaneously and sequentially generating an output of the first and additional works to produce a continuous or integrated composite composition from the fixed first and additional works.

BRIEF DESCRIPTION OF THE DRAWING

The drawing is a schematic front elevation view of a diorama having apparatus constructive in accordance with the present invention coupled to generate a randomly arranged composite unitary work having related content.

BEST MODE OF CARRYING OUT THE INVENTION

The apparatus and method of the present invention are applicable to the generation and delivery of audio works, visual works and audio-visual works. Unlike systems in which discrete works or compositions are merely output in sequence, however, the apparatus and method of the present invention enables the arrangement and delivery of pre-recorded or fixed audio-visual tracks in an integrated or continuous composite work having randomly arranged components.

As will be described hereinafter, the apparatus and method for the generation of composite, audio-visual works of the present invention has a wide range of applications. For the purpose of illustration, however, the system of the present invention will be described in detail in connection with an audio delivery or output system of the type that might be employed in connection with an exhibit or diorama.

As may be seen in the drawing, the audio delivery system of the present invention can be installed in an exhibit or diorama setting, generally designated 21, in which there are various environmental features, such as a tree 22, bush 23 and waterfall 24. Typically, these environmental elements are arranged against a backdrop 26 which may be painted or otherwise decorated to coordinate with the various elements to produce an overall visual effect depending upon the subject matter of diorama 21. As is typical, diorama 21 will also include various birds, mammals, reptiles and other animals 27 positioned in the diorama at appropriate locations with respect to the environment being depicted. In some versions, the diorama may include printed materials identifying the various animals, common plants and other elements so that the viewers can better understand the environment and interaction of the various components of the environment.

In recent years, such dioramas or displays have also included audio tracks so that the viewer of the diorama can also listen to the voices of the animals and typical sounds of the environment present in the display to enhance the overall learning experience and better simulate the environmental conditions. Thus, arranged strategically throughout diorama 21 are a plurality of audio speakers 28 that can be used to deliver the appropriate voices of the animals and ambient sounds which would be typical of the environment. Some displays further may include video means 29 which supplement the diorama effects by presenting moving visual works or further textural information and audio works, or combinations thereof. Finally, in more sophisticated displays 21, sensors 31 can be placed strategically so as to sense the presence or absence of people viewing the display. Such sensors are typically infrared sensors and are used to adjust the volume of the audio delivery system so as to reflect the number of viewers or to produce event-driven audio outputs. These speakers and sensors generally are positioned in hidden or camouflaged locations throughout diorama 21 so that they are not visually intrusive or objectionable.

In sound augmented dioramas, the typical approach of prior systems has been to create a continuous sound track, for example, of fifteen minutes to one half hour, by mixing together ambient environmental sounds and specific voices of animals which are to be depicted in the diorama. Thus, the creator of the audio track makes a composite recording in the studio in which various sounds are electronically overlaid on top an ambient background track to produce a single composite sound track. This enables, for example, the voices of specific birds and animals to be overlaid onto a background environmental track in which insects and other environmental sounds are present. Audio features such as running water, rain storms, wind, etc., also can be overlaid onto the work to form in the studio a pre-recorded and relatively sophisticated integrated composite audio work. This work then is provided to the display site or museum in a single continuous track for delivery through speakers 28.

In a similar fashion, composite video works relating to the diorama subject matter can be created and run simultaneously or sequentially with the audio track to enhance the delivery of information and effects to the viewers.

Prior art audio delivery systems will also include a playback apparatus 41 which has its audio output controlled through conductor means 54 by controller 42 for delivery of the audio playback, usually through conductor means 58 to a mixing means or apparatus 43 and downstream equalizer assembly 44 and speakers 28. Signals from sensors 31 are received through conductors 63 and a sensor interface 47 which transmits signals through conductor means 48 to controller 42. Controller 42 employs conductor means 51 to communicate with video display devices 29. Controller 42, playback apparatus 41 and storage means 53 can be provided as separate elements or combined as a single unit, such as a computer shown schematically by broken line 52. Computer 52 would include a hard disk and/or laser disk playback device 41. Such apparatus is broadly known in the prior art and does not, per se, constitute a novel portion of the present invention.

In the audio-visual delivery system of the present invention, there are a plurality of audio, visual or audio-visual works, each having a predetermined content and each stored in storage means, schematically shown at 53. Each of the plurality of works is stored, preferably by pre-recording the same on storage media, schematically shown as disks 55, with distinctive identification means, such as a track number, associated with each track. Moreover, each of the stored works has a predetermined, fixed content.

In the apparatus and method of the present invention, integrated composite works are formed by providing a plurality of works having content that is related in one of two ways, namely, sequentially related content and simultaneously related content. As used throughout this application, the expression "sequentially related content" shall mean that one work or composition has content in a beginning portion thereof which is sufficiently related to the content of the ending portion of another work or composition that a sequential playback or output of the two works will produce a composite output across the boundary between the two works which has a content that is continuous, integrated and substantially consistent. As used throughout this application, the expression "simultaneously related content" shall mean that one work or composition has a content which is sufficiently related to the content of another work or composition that a simultaneous playback or output of the two works will produce a composite output across the simultaneous overlaying of the two works which has a content that is continuous, integrated and substantially consistent. In the preferred form, sequentially related content and simultaneously related content are sufficiently related that the composite work resulting therefrom has substantially an unperceptible boundary between works or overlaying of works.

Most typically, the audio, visual or audio visual works are pre-recorded on a recording medium such as a compact disk, memory disk or laser disk 55, for reading by playback apparatus 41. It will be understood, however, that each work can have a predetermined, fixed content which is not "recorded" but is generated for each playback, for example, by software with storage medium 53 being comprised of computer memory. In each such case, nevertheless, the work has a known and fixed content.

The present invention can be illustrated by reference to its application to diorama 21. A plurality of works having a predetermined fixed content are stored on disks 55 in storage device 53. For the diorama, these works can include pre-recorded audio ambient background tracks. The ambient audio works may, for example, be comprised of recordings of the various insects and ambient sounds at different times of the day for the environment depicted in diorama 21. Thus, there may be five different ambient background audio tracks for dawn, five different ambient background audio tracks for mid-day, and five different ambient background audio tracks for dusk. Obviously, ambient nighttime audio tracks might also be provided. The ambient background audio tracks also are referred to herein as "primary works".

The plurality of works on storage media 55 also includes a plurality of "second" works or "additional" works or "secondary" works. In this case a plurality of animal and bird voices and other special effects, such as rain storms, wind, music and narration can comprise the second, additional or secondary works. The content of all of the secondary tracks will relate to at least some of the first or primary ambient audio tracks by having either a sequentially related content or a simultaneously related content to the first work. Thus, the additional works will include birds and animals which vocalize at dawn, during mid-day and at dusk. Each one of the additional tracks will be identified by a distinctive cue or an address means which is readable by controller 42. Preferably, audio playback apparatus 41 will have the capability of playing back a plurality of tracks simultaneously, and controller device 42 includes a random selection means, schematically shown at 57, and a stored control program, which preferably is in the form of software in which each of the primary and secondary works stored in playback apparatus 41 are identified and control commands are provided.

The system of the drawing operates in the following manner. Controller 42 makes a selection from the plurality of works of a first work. In the diorama system, the selection of the first work is accomplished by selecting one of the ambient audio tracks or primary audio works. This primary work can be selected randomly using random selection means 57 or in accordance with a control program, for example, starting logically with a random selection of one of the five ambient dawn background tracks. Controller 42 signals playback apparatus 41 to commence playback of the selected first track, for example, "Dawn-2". Playback apparatus 41 delivers its output to mixing apparatus 43, equalizers 44, amplifiers 46 and finally to the speakers 28 selected by controller 41 for delivery of the background or ambient sound. Controller 42 can make the channel or speaker selection through control signals sent to mixer 43 through conductor means 69 and volume adjustments through conductor means 71. Together playback apparatus 41, mixer 43, equalizer 44, amplifier 46 and speakers 28 are broadly considered as "playback means."

Controller 42 next randomly selects from the plurality of stored audio tracks in storage means 53, a second or additional work which must have one of sequentially related or simultaneously related content, depending upon whether the two works are to be sequentially or simultaneously played. In the case of the diorama, the works are to be simultaneously output, and the selection will be made from works or tracks that can be overlaid on the background or first work which was selected. Once the selection of the additional work is made, controller 42 signals playback apparatus 41 to play the selected additional track.

Preferably, the selected additional track is delivered to mixing apparatus 43 and is thereafter sent through conductors 59 to equalizers 44 and conductors 61 to amplifier assembly 46. The signal is finally delivered through conductors 62 to selected speakers 28 for output of individual voices, animals and birds, at appropriate locations in diorama 21. While it would be possible to play the selected additional track without electronic mixing at mixing apparatus 43, overlaying the additional track with the primary track is preferable for best sound quality, even though the mixing apparatus, as controlled by controller 42, will deliver the additional work to only a selected one or ones of speakers 28, while the ambient track is being delivered to a plurality of other speakers.

Controller 42 exercises a control function in that having selected "Dawn-2" as the ambient track which is being played, it will permit, enable or allow only those secondary tracks which have recordings of birds, animals, or other sounds that could be present in the ambient track being played back by apparatus 41. Thus, a recording of a bird that is active only at dusk could not be played back during a play of "Dawn-2". Conversely, animals that are only active in the morning would be available for selection by random selection means 57 when the first work selected is the "Dawn-2" track.

Controller 42 further randomly selects the spacing between voices or play of additional works simultaneously with the first work so as to more closely approximate the occurrence of such events in the natural environment. Similarly, the location at which output of the secondary or additional overlaid works occurs can be randomly varied among speakers 28 which are located at positions appropriate for the voices to occur.

Additionally, controller 42 is responsive to signals from sensors 31, not only vary the volume of the sound delivered as a function of crowd density, but also to control the timing and selection of output of works or voices. Thus, if there is a listener standing in front of bush 23, the sensor 31 proximate bush 23 will communicate a signal through conductor means 63 to interface 47 and thereafter through conductor means 48 to controller 42. The controller will then respond to the sensor input signal to cause random selection 57 to immediately select and play one of the pre-recorded tracks of an animal 27 that would be a natural inhabitant of or be likely to be located in bush 23. The random selection will be limited to bush-dwelling animals and will be event-driven, namely, by the listener walking in front of the bush. In essentially real-time, therefore, as the listener walks in front of the bush one of a typical bush-dwelling animal tracks that also is active at the time of the ambient track, for example, dawn, will vocalize. The other tracks which do not meet these criteria, however, will be disabled or prevented from selection and playing by the controller.

The event-driven audio track will be layered on the background ambient track at mixer 43 with any randomly selected, layered-on, secondary voices which also are occurring. Controller 42 also can further control the delivery of sound by suppressing randomly selected ambient sounds which would be inappropriate depending upon the event-driven ambient sound. Thus, if birds would not sing during, or after, a large animal growls from behind bush 23, the event-driven playback of the growl would also suppress any randomly selected inappropriate bird track playback.

Controller software, therefore, can be used to make a random selection of an event-driven secondary audio track such as an animal sound, use the identification means or track number to identify the randomly selected audio sound by reference to memory-stored correlations of the tracks with identification means, determine the identity of any currently randomly selected playing secondary sounds, and either suppress or permit playback of the randomly selected sounds based upon the stored software criteria for playback or playback suppression.

Typically, the primary ambient sound tracks will range between ten and thirty minutes in length, with fifteen minutes being preferred. Once the first selected ambient track, "Dawn-2", is completed, controller 42 will select one of the five mid-day tracks, for example, "Mid-Day-5", and sequentially commence play of the same upon termination of the first ambient track playback Once the "Mid-Day 5" track has commenced, all of the dawn secondary works or recordings are disabled and the mid-day secondary works or recordings are enabled for both random and event-driven selection. At the end of the "Mid-Day-5" track, controller 42 will randomly select one of the five dusk tracks, for example, "Dusk-1". Simultaneously, all the stored secondary work tracks for the dusk voices will be enabled for both random and event-driven playback.

When the dawn-mid-day-dusk sequence is completed, controller 42 can return to the dawn ambient tracks and make a random selection from the remaining or previously unselected dawn tracks. Thereafter, the mid-day and dusk ambient tracks will be randomly selected to complete the sequence. This proceeds through 125 possible combinations of dawn, mid-day and dusk ambient sound tracks. Moreover, the timing of play of the specific or individual voices constituting the secondary works which are selected during the 125 ambient track combinations comprising the diorama "day" is random and therefore not repetitious to the listener or display employees.

Since the ambient sounds at various times of the day include common sounds that span across the borders between time categories, such as dawn and mid-day border or mid-day and dusk border, and since all of the various ambient tracks will be pre-recorded from the same or similar environment (for example, on different days), the sequencing between ambient sound tracks comprising a diorama "day", will not result in the audio sequences having abrupt discontinuities in them.

Using the system of the present invention, it is further possible to overlay other environmental effects such as a rain storm. Thus, one of the secondary audio tracks can be a rain storm track in which the storm pans or moves across the diorama from one speaker 28 to the others. In this process, some of the randomly selected secondary voices and even event-driven secondary voices may be suppressed during movement or panning of the rain storm across diorama 21. Similarly, the effect of man-made sounds on the environmental sounds can be demonstrated, and if desired, musical and/or narration can be included in the pre-recorded audio tracks. Usually, the sequencing from dawn to mid-day to dusk will be accompanied by changing the lighting effects. Lights 25, for example, can be driven by conductor means 66 directly from controller 42 or by a separate control means which is driven by controller 42.

It is a further important feature of the present invention that controller 42 can output to video display means 29 visual information relating to the diorama composite audio work. Thus, if the voice track of a randomly selected bird is being played, controller 42 communicating to displays 29 through conductor means 51 can cause an image of the bird to be displayed at video screens 29 in real-time with the bird's voice track. Further identifying information concerning the bird, also can be displayed. The video display screen 29 can further include user input means 67, for example, a keyboard, connected by conductor means 60 to controller 42, which will allow the user to access information concerning animal vocalizing from information stored and correlated to the playing secondary audio track in memory 68 of the controller. Thus, a viewer wanting more information about a parrot, monkey or alligator will be able to access that information and have the same displayed on the video display apparatus 29.

As will be seen, therefore, a very complex and yet integrated and varying composite audio-visual work can be delivered or output using the system of the present invention. Fifteen ambient sound recording tracks can be combined with 50 to 150 secondary or additional audio tracks to produce an integrated composite audio work with coordinated and therefore integrated visual effects. Individual secondary tracks may vary in length from ten seconds to thirty seconds, or longer, and they are randomly layered with the longer primary tracks to produce the composite integrated work.

In the application of the present invention to a diorama, the first work, the ambient audio track, and the second or additional work, the specific animal voices, are simultaneously related in content. Layering of the individual animal voices over the background ambient track produces a composite audio work in which the sound content is continuous, integrated and consistent across the overlaid simultaneous play of these two works. An animal voice appropriate to the background sound is heard, and yet the voice could be any one of a number of appropriate pre-recorded voices. The specific voice will output at randomly selected but appropriate locations and at random intervals from other voices.

In the diorama example, the additional work is also the selection of one of the other primary works for sequential play. Thus, as the dawn primary track ends, a mid-day primary track is sequentially played. The common environment and common insects and other animals which span the time categories of dawn and mid-day will result in the end of any of the dawn tracks and the beginning of any of mid-day tracks being sufficiently related in content that their sequential play will produce a composite output across the boundary between them which is continuous, integrated and consistent.

Use of the apparatus and method of the present invention to arrange and deliver an integrated composite musical work can also be described. Assuming for the sake of illustration that a 32 bar musical piece is to be created, one recording of an 8 bar statement of the main theme of the musical work can be made. Five alternate recordings of 8 bar developments of the main theme can then be recorded, as well as five 8 bar recapitulations of the theme and five 8 bar codas. Each of the development portions of the main theme will be musically commenced so as to sequence continuously and consistently across the boundary between the ending of the 8 bar statement of the main theme and each of the beginnings of the 8 bar developments of the main theme. Similarly, the 8 bar recapitulations each will sequentially musically flow across the boundaries with respect to the ending of the 8 bar developments, as will the codas. Controller 42 will first cause playback of the pre-recorded statement of the main theme and then randomly select one of five 8 bar developments of the main theme, followed by a random selection of one of the five 8 bar recaps, and followed by a random selection of one of the five 8 bar codas. The result will be a musical work which is integrated or consistent musically throughout and yet is randomly arranged from pre-recorded audio tracks. When played again, the controller will make different random selections to produce a different, and yet related, integral and consistent composite work from the pre-recorded tracks.

The same kind of sequencing can be used with visual works. Thus, a primary or first video track, for example, on a laser disk, can establish a video theme from which secondary pre-recorded tracks can branch. If the first video track is a picture of a person walking up to a house, ringing the doorbell and the door starting to open, a plurality of secondary visual tracks can show the door opening to reveal any one of a number of different people. The secondary track can then continue with the visitor being ushered visually through the door and into the interior of the house for discussion with the person who welcomed the visitor. A selection is then made between a plurality of pre-recorded video tracks for the entry of a third party into the room to further develop the visual work being generated. All of these visual effects can be accompanied by audio tracks which are related to and produce a composite, and yet integral and consistent audio-visual work. The content of the pre-recorded sequentially played works has to relate to the previous track, but each time a random selection between a plurality of pre-recorded works can be made to cause the resulting composite work to develop in a large number of different ways. The potential for storytelling, and particularly video storytelling, of the system of the present invention, therefore, is substantial.

The audio delivery system of the drawing can be implemented, for example, by means of a personal computer having a 386 and 486 central processing unit chip with pre-recorded audio and video material stored on a memory disk. Alternatively, a compact disk player, such as a TASCAM Model CD301 with a microprocessor unit in it, can be employed. The mixer 43 should have its outputs directed by controller 42 to go to any one of a number of channels. Such automated mixers are well-known in the industry and produced by manufacturers such as Megamix and Sound Craft. Equalizer assembly 44 will include a plurality of equalizers that are manually or solenoid adjusted in a conventional manner, depending upon the location of the speakers 28 and the geometry of the space or room in which the sound system is installed. Similarly, the amplifier assembly 46 is preferably independently adjustable so that each of the channels can be amplified by an amount appropriate to the structure. Controller 42 can adjust the amplification within ranges which are preset through conductor means 71 in response to sensing signals from sensors 31.

A sensor interface 47 can be an interface of the type employed in intrusion detection units, such as National Security Model 13T5, which have been found to interface with a 386 general-purpose, digital computer.

A software suitable for operation of the controller is straight forward to write in that each of the pre-recorded tracks can be identified by distinctive identification means with the software providing the suppression and enable logic in accordance with a correlation of the nature of the track with its identification means. Random selection of the identified tracks, of course, is easily accomplished through the software, and supplemental information concerning tracks being played can be correlated in the software and/or stored and accessed in computer memory.

What is claimed is:

1. An apparatus for the arrangement and delivery of an integrated composite work having at least one of audio and visual content, said apparatus comprising:
   (a) playback means for generation of at least one of audio and visual output;
   (b) storage means;
   (c) a plurality of works of predetermined fixed content contained in said storage means, each of said plurality of works containing one of sequentially related content and simultaneously related content to at least one other of said plurality of works, and distinctive identification means in said storage means associated with each of said plurality of works identifying the content of each of said works; and
   (d) control means connected to said playback means and said storage means and generating playback through said playback means of selected works stored in said storage means, said control means selecting a first work of predetermined fixed content using said identification means and to producing playback of said first work through said playback means, and said control means further randomly selecting from a remainder of said plurality of works in said storage means at least one second work having one of sequentially related and simultaneously related content and producing playback of said second work by one of sequential and simultaneous playback with said first work to produce an integrated composite work.

2. The apparatus as defined in claim 1 wherein,
said storage means is formed for storing media having said plurality of works thereon; and
at least one media member having said plurality of works thereon and mounted in said storage means.

3. The apparatus as defined in claim 2 wherein,
said media is provided by a recording media having pre-recorded works of at least one of audio content and visual content.

4. The apparatus as defined in claim 3 wherein,
said control means produces simultaneous playback of said first work and a sequence of randomly selected second works.

5. The apparatus as defined in claim 4 wherein,
said playback means includes mixing means connected for mixing said first work and said second work prior to delivery of the playback of said composite work.

6. The apparatus as defined in claim 3 wherein,
said recording media has a plurality of audio works stored thereon each having a differing predetermined audio content and including a plurality of audio works suitable for selection of said first work and a plurality of audio works suitable for selection as said second work;
said control means produces a random selection and playback of said first work, and produces a simultaneous playback of a sequence of second works each having simultaneously related audio content to said first work.

7. The apparatus as defined in claim 1 wherein,
said control means produces simultaneous playback of said first work and a sequence of randomly selected second works.

8. The apparatus as defined in claim 1 wherein,
said plurality of works each include visual content.

9. The apparatus as defined in claim 1 wherein,
said playback means includes video playback means and audio playback means connected to said control means.

10. In an audio deliver system including audio playback means having at least one audio recording storage medium mounted in said playback means and having a plurality of pre-recorded audio tracks thereon, said audio track each being identified by distinctive identification means, and playback control means electrically connected to control operation of said audio playback means and to control selective play of said audio tracks by use of said identification means, wherein the improvement in said audio delivery system comprises:
said audio tracks on said storage medium includes at least one primary audio track having a fixed predetermined audio content and a plurality of secondary audio tracks each having a fixed predetermined audio content which is one of sequentially related and simultaneously related to said audio content of said primary audio track; and
said playback control means controls playback of said audio tracks by causing playback of said primary audio track and causing one of simultaneous and sequential playback of a random sequence of said secondary audio tracks.

11. The audio delivery system of claim 10 wherein,
said plurality of audio tracks includes a plurality of pre-recorded secondary audio tracks having simultaneously related audio content to said primary audio track; and
said playback control means selects one of said primary audio tracks and produces playback by said audio playback means and simultaneously produces random playback of said secondary audio tracks.

12. The audio delivery system as defined in claim 11 wherein,
said plurality of audio tracks includes a plurality of primary audio tracks of differing audio content; and
said playback control means randomly selects and produces playback of one of said plurality of primary audio tracks, and produces a simultaneous random sequential playback of one of said secondary audio tracks having simultaneously related audio content to the selected primary audio track, and thereafter produces a random selection of another primary audio track and during playback thereof produces a simultaneous random sequential playback of secondary audio tracks having simultaneously related audio content to said another primary audio track.

13. The audio delivery system as defined in claim 12 wherein,
said audio recording storage medium is provided by one of a compact disk, a hard disk and a laser disk,
said audio playback means is provided as disk player means electrically coupled to a speaker system,
said playback control means is provided by a digital computer having storage means with information related to each of said audio tracks stored therein and correlated to said identification means for said tracks.

14. The audio delivery system as defined in claim 13 wherein,
said storage medium is provided by a plurality of compact disks,
said primary audio tracks are provided by audio tracks of ambient sounds of a predetermined environment; and
said secondary audio tracks are provided by audio tracks of specific sounds which can occur in said predetermined environment.

15. The audio delivery system as defined in claim 13 wherein,
said compact disk player means includes sound mixing means for electronically mixing together said primary audio track and the simultaneously played secondary audio tracks prior to playback through said speaker system.

16. The audio delivery system as defined in claim 13 wherein,
said speaker system includes a plurality of speakers positioned in relatively spaced relation,
said disk player is electrically connected to communicate signals to any one of said plurality of speakers,
said playback control means controls communication of said signals to said speakers.

17. The audio delivery system as defined in claim 10, and sensor means for sensing the presence of a listener proximate said audio delivery system, said sensor means being coupled to said playback control means for communication of signals thereto; and said playback control means being responsive to signals from said sensor means to control at least one of the volume of playback by said audio playback means and the selection of said secondary audio tracks.

18. The audio delivery system as defined in claim 1 wherein, said playback control means is responsive to signals from said sensor means to produce playback by said audio playback means of a selected one of said secondary audio tracks.

19. The audio delivery system as defined in claim 18 wherein, said playback control means is responsive to signals from said sensor means to produce playback of said selected one of said secondary audio tracks and suppress playback of randomly selected secondary audio tracks having an audio content conflicting with the audio content of said selected one of said secondary audio tracks.

20. The audio delivery system as defined in claim 10, and video playback means electrically connected to said playback control means and responsive to receipt of control signals from said playback control means to produce video images related to sound being produced by said audio playback means.

21. The audio delivery system as defined in claim 20 wherein, said playback control means includes data storage means having date stored therein relating to said primary audio track and said secondary audio tracks, and user input means coupled to said playback control means and formed to permit a user to display images on said video playback means based upon said data stored in said data storage means.

22. The audio delivery system as defined in claim 11 wherein, said playback control means provides random intervals of time between playback of said secondary works in said random sequential playback.

23. The audio delivery system as defined in claim 12 wherein, said primary audio tracks all have related content.

24. The audio delivery system as defined in claim 11 wherein, said audio playback means includes a plurality of spaced apart speakers connected to deliver audio output at a plurality of locations; and said playback control means produces playback of said secondary audio tracks at randomly selected speakers.

25. The audio delivery system as defined in claim 11 wherein, said audio playback means includes a plurality of spaced apart speakers connected to deliver audio output at a plurality of locations; and said playback control means produces random panning of audio output across said plurality of speakers.

26. A method of arranging and producing an integrated composite audio work comprising the steps of:

(a) generating one of an audio and visual output of a first work having a predetermined fixed content;

(b) randomly selecting at least one additional work from a plurality of additional works, each having a predetermined fixed content, said content of said additional works being one of sequentially and simultaneously related to said content of said first work; and (c) at least one of:
   (i) simultaneously with said generating step, producing an output of a selected one of said additional works having simultaneously related content, and
   (ii) sequentially with said generating step, producing an output of a selected one of said additional works having sequentially related content.

27. The method as defined in claim 26 wherein, said first work has a first length of play time;

said additional works each have a second length of play time substantially less than said first length of play time;

said randomly selecting step is accomplished by selecting a random sequence of said additional works each having simultaneously related content; and said step of producing an output is accomplished by simultaneously producing an output of said sequence of said additional works during said step of generating an output of said first work.

28. The method as defined in claim 27 and the step of:

electronically mixing said first work and said additional works prior to output thereof.

29. The method as defined in claim 26, and the step of:

sensing one of the presence and absence of a listener in an area enabling one of seeing and listening said output, making a listener-driven selection of one of said additional works, and producing one of a simultaneous and a sequential output of said listener-driven selection with output of said first work.

30. The method as defined in claim 29 wherein, said sensing step is accomplished at a plurality of locations; and said step of making a listener-driven selection is accomplished by making a selection dependent upon the one of said locations at which a listener's presence is sensed.

31. The method as defined in claim 26 wherein, said first work is an audio recording of ambient environmental sounds; and said additional works are audio recordings of specific sounds found in an environment of the type having said ambient environmental sounds.

32. The method as defined in claim 31, and the addition step of:

generating a visual output of an image related to one of said first work and the selected one of said additional works during output thereof.

33. The method as defined in claim 32 wherein, said step of generating a visual output is accomplished by generating a video output.

34. The method as defined in claim 26, and the additional step of:

responding to user input to produce one of an audio and a visual output providing additional information as to one of said first work and the selected one of said additional works.

* * * * *